July 15, 1924.
H. HANSON
COTTON PICKER
Filed Aug. 11, 1921
1,501,334
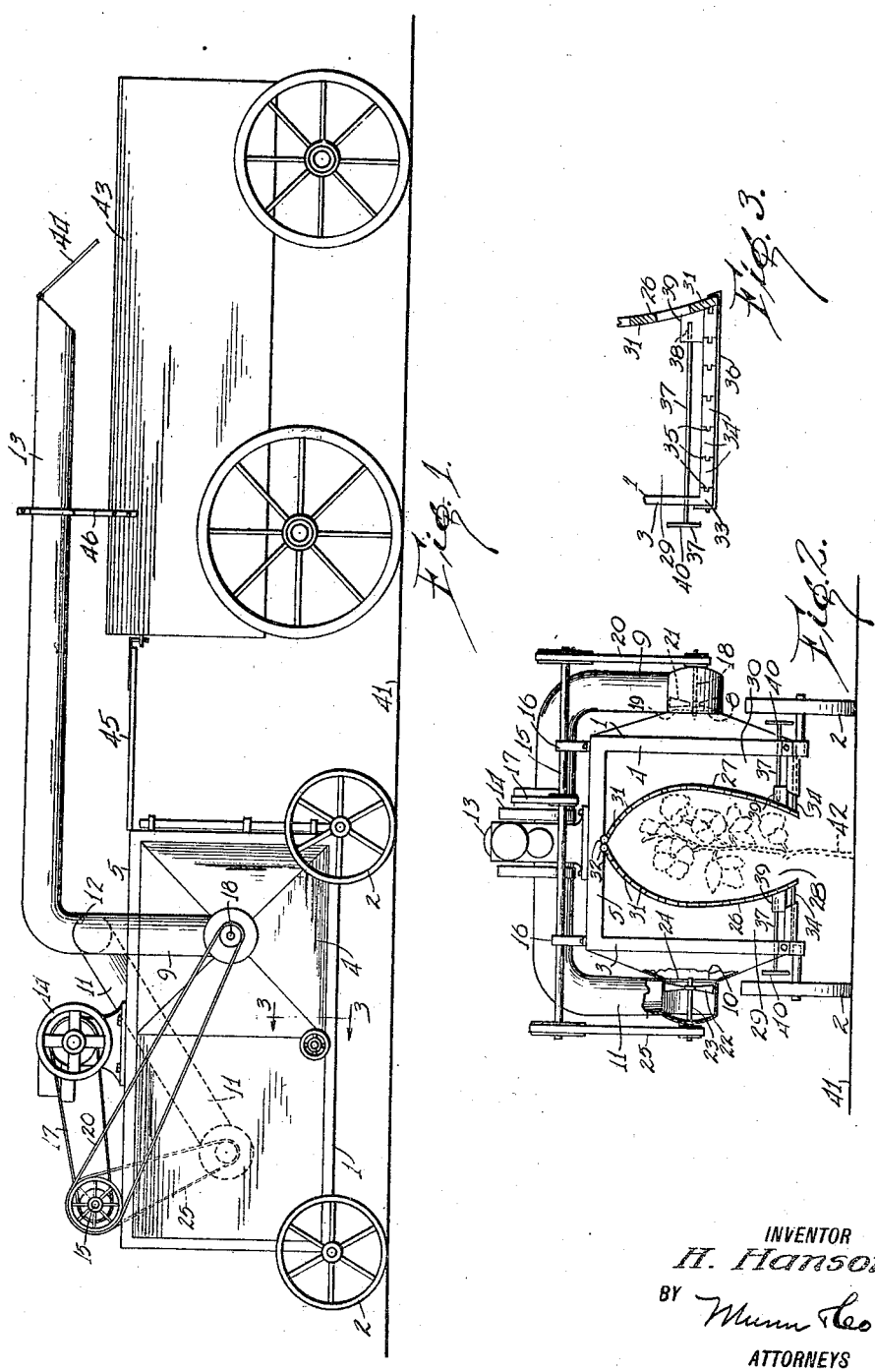
INVENTOR
H. Hanson
BY
ATTORNEYS Patented July 15, 1924.

1,501,334

UNITED STATES PATENT OFFICE.

HERMAN HANSON, OF NEWARK, ILLINOIS.

COTTON PICKER.

Application filed August 11, 1921. Serial No. 491,423.

*To all whom it may concern:*

Be it known that I, HERMAN HANSON, a citizen of the United States, and a resident of Newark, in the county of Kendall and State of Illinois, have invented a new and useful Improvement in Cotton Pickers, of which the following is a full, clear, and exact description.

My invention relates to devices for picking the soft fibrous substance from cotton plants in the field, and it consists in the combinations, constructions and arrangements herein described and claimed:

An object of my invention is to provide a device having means for occasioning the removal of cotton from plants standing in a row in the field and for collecting the cotton removed from the plants.

A further object of my invention is to provide a device of the character described having means for collecting cotton from the plant and for raising cotton from the ground at the same time.

A further object of my invention is to provide a device of the character described that has means arranged to occasion the removal of cotton from opposite sides of the plant over which the device is moved.

A further object of my invention is to provide a device of the character described that is relatively simple in construction and operation, not likely to get out of order easily and thoroughly effective for the purpose intended.

Other objects and advantages will appear in the following specification, and the novel features of the invention will be particularly pointed out in the appended claims.

My invention is illustrated in the accompanying drawings forming part of this application, in which—

Figure 1 is a side elevation of a device embodying my invention,

Figure 2 is an end view of a portion of the mechanism shown in Figure 1, arranged in a desired position with respect to a cotton plant, and Figure 3 is a sectional view of a fragmentary portion of the device along the line 3—3 of Figure 1.

In carrying out my invention, I provide a body 1 that is mounted for movement on ground wheels 2. The body 1 comprises side walls 3 and 4, and a top 5. In other words, the body 1 resembles an inverted U the side wall 4 is "dished" outwardly adjacent to one end and is provided with an opening 8 communicating with a conduit 9. The side 3 is outwardly "dished" adjacent to the opposite end of the body and is provided with an opening 10 communicating with a conduit 11. The conduits 9 and 11 are united as at 12 to provide a main conduit 13 which is arranged to extend rearwardly and is open at its remote end.

A prime mover 14 is supported on the top 5. A jack shaft 15 journaled in brackets 16 secured to the top 5 is operatively connected with the prime mover 14 in any suitable manner, as by means of the belt and pulley connection indicated generally at 17. A driven shaft 18 is journaled in the wall of the conduit 9 and in a strip 19 diametrically disposed across the opening 8. The shaft 18 is operatively connected with the jack shaft 15 by any suitable means, such as the belt and pulley mechanism indicated generally at 20. A fan 21 is rigidly mounted on the shaft 18, as shown.

A fan 22 that is similar to the fan 21 is rigidly mounted on a driven shaft 23. The latter is journalled in a wall of the conduit 11 and in a strip 24 arranged diametrically across the opening 10. A belt and pulley arrangement indicated generally at 25 operatively connects the shaft 23 with the jack shaft 15.

The space within the casing or body 1 is divided by partitions or barriers 26 and 27 to provide a central compartment 28 extending the length of the body and flanked by similar compartments 29 and 30. It is to be observed that the compartment 30 communicates with the conduit 9 and that the compartment 29 communicates with the conduit 11. The partition walls 26 and 27 are similar and each comprises a plurality of spaced apart longitudinally extending slats 31 secured together at their ends and relatively arranged so that the partition wall is substantially semi-elliptical in cross section. The partition walls 26 and 27 are attached by hinges 32 to the under side of the top 5 in close juxtaposition, as best seen in Figure 2, and the lower end of each may be moved toward or away from the adjacent side wall of the body 1.

The side walls 3 and 4 are formed with inwardly extending ribs along their lower edges, as indicated at 33. A plurality of slats or panels 34 are arranged to co-engage and to engage with the ribs 33, as by means of a tongue and groove arrangement, such as indicated at 35 to provide an adjustable bottom wall or platform for each of the compartments 29 and 30, while the elliptical compartment 28 is left open at its lower side. The slats or panels 34 extend substantially the entire length of the body 1 and are prevented from sagging by any suitable means, such as the flexible strap 36 which is secured at one end to the lower slat 31 and attached at its other end to the adjacent side wall of the body 1. It will be understood that the width of the compartment 28 at its lower end may be varied at will by varying the number of slats in the bottom walls of the compartments 29 and 30. The flexible straps 36 will be drawn taut each time a slat is removed from or added to the bottom wall construction. The partition walls 26 and 27 may be moved by means of similar screws 37—37, each of which is threaded through an opening in the adjacent side wall of the body 1 and is flexibly attached, as at 38, to a block 39 secured to the adjacent partition wall. Each of the screws 37—37 has a portion protruding exteriorly of the body 1 and carries a hand wheel 40 at its outer end.

From the foregoing description of the various parts of the device, the operation thereof may be readily understood. The body 1 is drawn over the ground 41 by any convenient means so that the walls 26 and 27 straddle the cotton plants, one of which is shown at 42. It will be understood that the cotton plants 42 are in rows and that the plants of a row enter the compartment 28 successively as the body 1 is drawn across a field. The operation of the fan 22 creates a suction which draws the upper portion of the plant 42 against the partition 26. The soft fibrous substance encasing the seeds of the cotton plant and referred to herein as the "cotton" is detached from the plant by the suction and passes through the spaces between adjacent slats 31 into the conduit 11. Upon further movement of the body 1, the plant is drawn against the partition 27 by the suction due to the operation of the fan 19 and cotton is detached from the opposite side of the plant and is forced into and along the conduit 9. In addition, such cotton as has fallen to the ground will be drawn into the compartment 28 by the suction created in the manner described and will be forced along the conduits 11 and 9. The cotton entering the conduits 11 and 9 will pass along the main conduit 13 and will be discharged at the remote end thereof. A suitable receptacle which may be a vehicle 43, is positioned with respect to the body 1 to receive the cotton discharged from the conduit 13. A deflector plate 44 attached to the conduit 13 deflects the cotton discharged downwardly into the receptacle 43.

In the event that the receptacle 43 is a vehicle, such as illustrated, it is attached by means of a draw bar 45 to the body 1 and serves as a trailer. A support 46 may be carried by the receptacle 43 for supporting the conduit 13 adjacent to its free end.

The device provides a simple, relatively inexpensive means for performing the functions for which intended. It is obvious that a great saving in time and labor will result when my improved device is used.

I claim:

1. A device of the character described comprising a vehicle having a body portion formed with an opening in its lower side extending the entire length of the body, a pair of longitudinally extending partition members hingedly connected along their upper edges to the top wall of the upper side of the body portion, each of said partition members being formed with a plurality of openings therethrough, means for adjustably connecting each partition member adjacent to its lower edge to the adjacent side wall of the body portion, a conduit carried by the vehicle and arranged with its intake end opening through one of the side walls of one side of the body portion adjacent to one end of the wall, a second conduit carried by the vehicle and arranged with its intake end opening through the other side wall of the body portion and at the opposite end of the body from that of the first intake pipe, and a suction creating means arranged in each conduit adjacent to its intake end for drawing detachable adjacent substances, such as the cotton fiber of a standing cotton plant, through the openings in the partition members into the conduits.

2. A device of the character described comprising a U-shaped frame adapted to be moved along the ground, the open end of said frame being disposed adjacent to the ground, suction pipes communicating with the side walls of said frame and being disposed at the opposite end of said frame, longitudinally extending perforated partitions hingedly carried by the top of said frame and being adapted to swing toward and away from each other, said partitions being spaced from and parallel with respect to each other and being adapted to receive a cotton plant therebetween, and an adjustable platform disposed between said partitions and said side walls.

3. A device of the character described comprising a U-shaped frame adapted to be moved along the ground, the open end of said frame being disposed adjacent to the ground, suction pipes communicating with the side wall of said frame and being disposed at the opposite end of said frame, longitudinally extending perforated partitions hingedly carried by the top of said frame and being adapted to swing toward and away from each other, said partitions being spaced from and parallel with respect to each other and being adapted to receive a cotton plant therebetween, and adjustable platform disposed between said partitions and said side walls, said platform consisting of a plurality of interlocking boards, a block carried by the lower ends of said partitions, and a hand screw connected to said block and projecting through said side walls of said U-shaped frame, said hand screw being adapted to hold said partitions in engagement with said platform, whereby the openings between the partitions and the side walls are closed.

HERMAN HANSON.